United States Patent [19]

Murabayashi et al.

[11] Patent Number: 4,989,102

[45] Date of Patent: Jan. 29, 1991

[54] APPARATUS FOR MAGNETICALLY RECORDING AND/OR REPRODUCING DIGITAL SIGNALS IN A PLURALITY OF MODES HAVING DIFFERENT FORMATS

[75] Inventors: Noboru Murabayashi, Tokyo; Keiji Kanota, Kanagawa, both of Japan

[73] Assignee: Sony Corporation, Tokyo, Japan

[21] Appl. No.: 252,925

[22] Filed: Oct. 4, 1988

[30] Foreign Application Priority Data

Oct. 8, 1987 [JP] Japan ............................ 62-253974

[51] Int. Cl.$^5$ ............................................. G11B 5/02
[52] U.S. Cl. ................................................. 360/27
[58] Field of Search .................. 360/27, 28, 32, 65, 360/46

[56] References Cited

U.S. PATENT DOCUMENTS 4,445,151  4/1984  Kinoshire et al. ................. 360/27
4,656,533  4/1987  Sakai et al. ........................ 360/46
4,819,042  4/1989  Richards ............................ 360/27

Primary Examiner—Vincent P. Canney
Attorney, Agent, or Firm—Alvin Sinderbrand; William S. Frommer

[57] ABSTRACT

In an apparatus for magnetically recording and/or reproducing digital signals in a plurality of modes characterized by different respective formats, pilot signals having different frequencies are generated to identify the modes, respectively, and, during a recording operation in one of such modes, the respective pilot signal is mixed with the digital signal to be recorded for providing a resultant mixed signal which is recorded. Thereafter, during a reproducing operation of the apparatus, the pilot signal included in the reproduced mixed signal is detected for determining the format of the recorded signal on the basis of the frequency of the detected pilot signal, whereupon the respective mode of the apparatus is established.

4 Claims, 1 Drawing Sheet

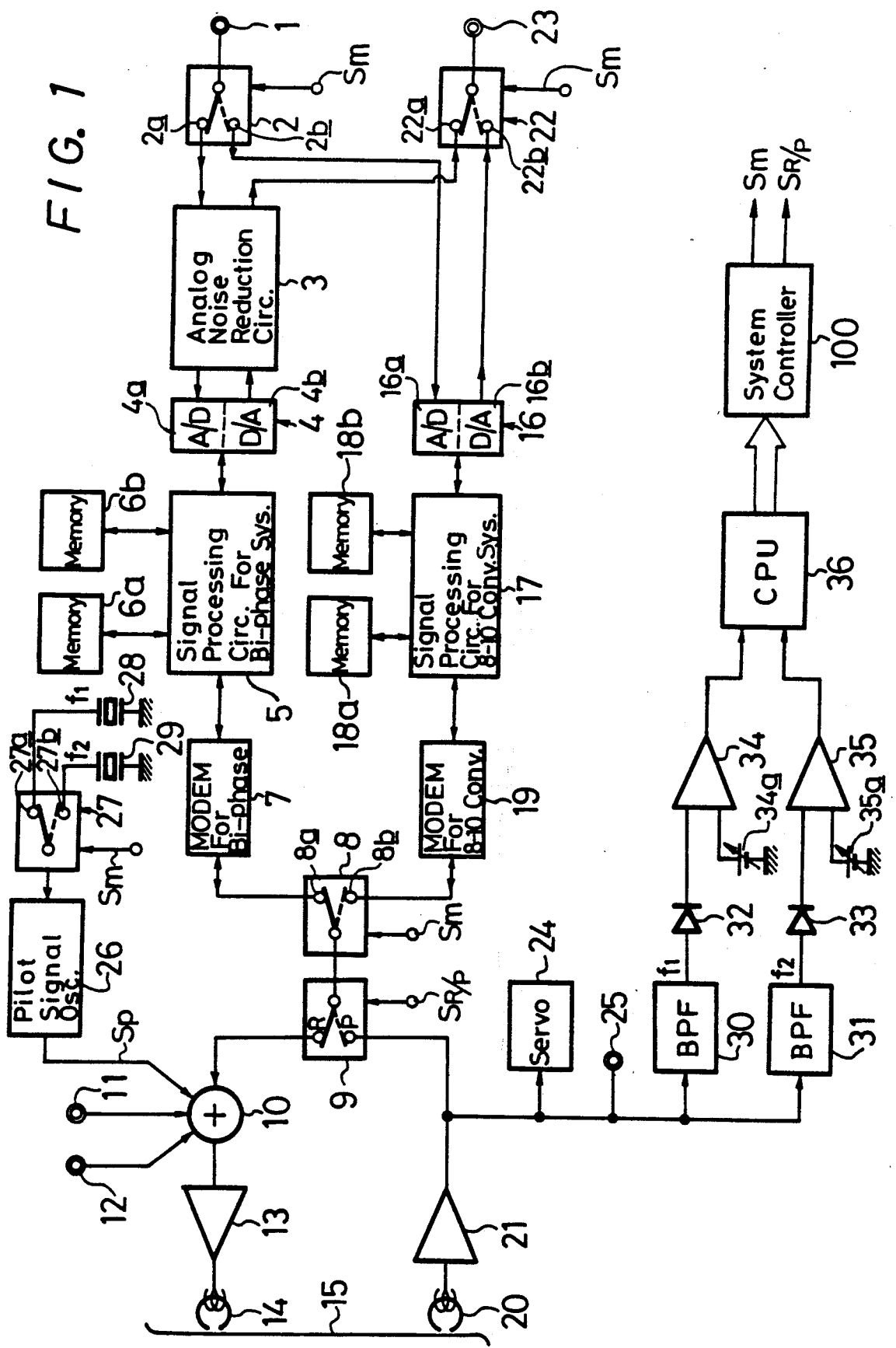

APPARATUS FOR MAGNETICALLY RECORDING AND/OR REPRODUCING DIGITAL SIGNALS IN A PLURALITY OF MODES HAVING DIFFERENT FORMATS

BACKGROUND OF THE INVENTION

1. Field of the Invention

The present invention relates to an apparatus for magnetically recording and/or reproducing a digital signal, such as, the PCM audio signal of a so-called 8-mm video tape recorder (VTR) or the like.

2. Description of the Prior Art

In the 8-mm VTR, the audio signal is digitally recorded and reproduced in the form of a pulse code modulated (PCM) signal in a portion of each of the slant tracks on a magnetic recording tape, for example, as described in further detail in U.S. Pat. No. 4,551,771, having a common assignee herewith. In such recording of the PCM audio signal by an 8-mm VTR, as standardized, the audio signal is sampled at a frequency about twice the horizontal frequency of the video signal being recorded in the remaining portion of each slant track, for example, with a sampling frequency of 31.5 kHz in the case of the NTSC standard, and is encoded in polygonal-line 8 bits (corresponding to rectilinear 10 bits) prior to being recorded in accordance with the so-called bi-phase system. In the bi-phase system, each bit which is a binary "1" is represented by a first frequency, and a second or different frequency represents each bit which is a binary "0".

Further, for the recording and reproducing of video signals, it has been proposed to employ a high coercive magnetic substance as the recording medium so as to extend the transmission bandwidth and thereby provide a video image of relatively higher quality. In such case, the combination of the extended transmission bandwidth and the use of the 8-10 modulation or conversion system employed in the so-called R-DAT or the like, for example, as disclosed in U. S. Pat. Nos. 4,577,180 and 4,617,552, also having a common assignee herewith, enables the PCM audio recording to greatly improve the quality of the recorded sound by permitting the sampling of the audio signal at a relatively high sampling frequency, for example, at 48 kHz, and by encoding the same in rectilinear 16 bits.

The modulation/demodulation circuits or modem required for the recording and reproducing of the PCM audio signal in accordance with bi-phase system or mode are substantially different, in format, from the modulation/demodulation or modem required for recording and reproducing of the PCM audio signal in accordance with the more recently proposed or developed 8-10 modulation or conversion system or mode. Accordingly, in an apparatus provided for reproducing the PCM audio signal recorded in accordance with either the bi-phase system or mode or the 8-10 modulation system or mode, it is necessary to employ first and second signal processing circuits adapted to the formats of the bi-phase system or mode and the 8-10 modulation system or mode, respectively, and further to detect the format of the signal being reproduced and enable operation of the respective one of the signal processing circuits. However, in the prior art, there has not been developed an appropriate method or apparatus for discriminating between the different formats with which the PCM audio signal may be recorded.

In the case of the R-DAT, it is possible to record in a selected one of a plurality of modes employing different sampling frequencies of, for example, 48 kHz, 44.1 kHz and so on. However, these various modes in the R-DAT employ the same recording format for the modulating system so that the several modes can be identified or discriminated by means of respective ID codes included in the digital signal to be recorded. In a reproducing operation, the ID code included in the recorded digital signal is readily detected for controlling the change-over or selection of the signal processing circuits. On the other hand, since the formats for the modulation system or the like are quite different for the bi-phase system and for the 8-10 modulation or conversion system, it is not possible to use an ID code included in the digital signal for controlling the selection of the signal processing circuits.

OBJECTS AND SUMMARY OF THE INVENTION

Accordingly, it is an object of the present invention to provide an apparatus for magnetically recording and/or reproducing digital signals in a plurality of modes characterized by different respective formats, and which avoids the foregoing problems associated with the prior art.

More specifically, it is an object of the present invention to provide an apparatus, as aforesaid, for magnetically recording and/or reproducing a digital signal in a first mode, such as, the bi-phase system, or in a second mode, such as, the 8-10 modulation or conversion system, and in which the mode or system employed for recording is readily detected or determined when reproducing the recorded digital signal so as to reliably effect the enabling of a signal processing circuit appropriate for the mode used in recording.

In accordance with an aspect of this invention, in an apparatus for magnetically recording and/or reproducing a digital signal in a first mode characterized by a respective transfer rate and format or in a second mode characterized by a respective transfer rate and format, there are provided: means for generating a first pilot signal having a first frequency and a second pilot signal having a second frequency different from said first frequency; means operative in the first and second modes during a recording operation of the apparatus for selectively mixing the first and second pilot signals, respectively, with the digital signal to be recorded, and thereby providing a resultant mixed signal; means selectively operative for recording and reproducing the mixed signal; and means operative during a reproducing operation of the apparatus for selectively detecting, in the reproduced mixed signal, the first and second pilot signals having the first and second frequencies, respectively, and, on the basis of the detected pilot signal, establishing the respective one of the first and second modes of the apparatus, that is, rendering operative the signal processing circuit appropriate for the format of the recorded digital signal.

The above, and other objects, features and advantages of the present invention, will be apparent in the following detailed description of a preferred embodiment which is to be read in conjunction with the accompanying drawing.

BRIEF DESCRIPTION OF THE DRAWING

FIG. 1 is a block diagram illustrating an apparatus for magnetically recording and/or reproducing a digital signal in accordance with an embodiment of this invention.

DETAILED DESCRIPTION OF THE PREFERRED EMBODIMENT

In the embodiment of the invention illustrated in FIG. 1, an input audio signal is supplied from an input terminal 1 to a mode change-over switch circuit 2 having output terminals 2a and 2b to which the audio signal is selectively directed in response to a mode selection signal $S_m$ applied to the mode change-over switch circuit 2 from a system controller 100, as hereinafter described in detail. At this point, it is sufficient to note that, in a first mode corresponding to the bi-phase system, the mode change-over switch circuit 2 is in the condition represented in full lines on FIG. 1 so that the input audio signal is supplied through the output terminal 2a to an analog noise reduction circuit 3. During a recording operation, the signal encoded by the analog noise reduction circuit 3 is supplied to an analog-to-digital (A/D) converting section 4a of a converting circuit 4 which further includes a digital-to-analog (D/A) converting section 4b operative during a reproducing operation. The converted digital signal from the A/D converting section 4a is supplied to a signal processing circuit 5 for the bi-phase system, and wherein the digital signal is encoded for data compression from 10 to 8 (10–8) bits. During a reproducing operation, the signal processing circuit 5 effects error correction and interpolation in cooperation with memories 6a and 6b.

The encoded 8-bit PCM signal which is output from the processing circuit 5 during a reproducing operation is supplied to a modulating and demodulating circuit (MODEM) 7 for the bi-phase system, and the modulated output signal from the circuit 7 is supplied to a terminal 8a of a mode change-over switch circuit 8 which is also controlled by the mode selection signal $S_m$ from the system controller 100 so as to be in the condition shown in full lines on FIG. 1 in the first mode corresponding to the bi-phase system. Therefore, the modulated output signal from the circuit 7 is supplied through the mode change-over switch circuit 8 to a recording/reproducing change-over switch 9 which is controlled by a signal $S_{R/P}$ from the controller 100 so as to be in the condition shown in full lines on FIG. 1 during a recording operation. Thus, the modulated signal is provided from a recording terminal R of the switch circuit 9 to an input of a mixing circuit or multiplexer 10 wherein the modulated signal is mixed or multiplexed with an input video signal supplied from an input terminal 11 and also with a servo pilot signal supplied from an input terminal 12. The resultant mixed or multiplexed signal obtained at the output of the mixing circuit 10 is supplied through a recording amplifier 13 to a recording head 14 for recording by the latter on a magnetic tape 15.

In a second mode which corresponds to the 8–10 conversion system, the mode selection signal $S_m$ from the system controller 100 changes-over switch circuits 2 and 8 to the conditions shown in broken lines on FIG. 1, and in which terminals 2b and 8b of the switch circuits 2 and 8 respectively, are engaged. Thus, when the apparatus is in its second mode during a recording operation, the audio signal applied to the input terminal 1 is supplied from terminal 2b of switch circuit 2 to an analog-to-digital (A/D) converting section 16a of a converting circuit 16 which further includes a digital-to-analog (D/A) converting section 16b operative during a reproducing operation. The converted digital signal from the A/D converting section 16a is supplied to a signal processing circuit 17 for the 8–10 conversion system, and wherein the converted digital signal is encoded for error correction and interpolation in cooperation with memories 18a and 18b. The encoded 16-bit PCM signal issuing from the processing circuit 17 in the second mode during a recording operation is supplied to a modulating and demodulating circuit (MODEM) 19 for the 8–10 conversion system. The modulated signal from the MODEM 19 is supplied to the terminal 8b of the mode change-over switch circuit 8, and hence is passed through the switch circuit 8 and the recording-/reproducing switch circuit 9 to the mixing circuit 10 for mixing or multiplexing with the input video signal from the terminal 11 and the servo pilot signal from the terminal 12. Once again, the resultant mixed or multiplexed signal obtained at the output of the mixing circuit 10 is supplied through the recording amplifier 13 to the recording head 14 for recording by the latter on the tape 15.

During a reproducing operation, the recording/reproducing switch circuit 9 is changed-over by the signal $S_{R/P}$ from the controller 100 so as to be in the condition shown in broken lines on FIG. 1. Thus, a signal reproduced from the tape 15 by a reproducing head 20 is supplied through a reproducing amplifier 21 to a playback terminal P of the switch circuit 9, and thence through the latter and the mode change-over switch circuit 8 to either the MODEM 7 for the bi-phase system or the MODEM 19 for the 8–10 conversion system. Assuming, at this time, that the first mode corresponding to the bi-phase system is established by the mode selection signal $S_m$, the reproduced signal is passed through the switch circuit 8 in the condition shown in full lines on FIG. 1 to the MODEM 7, and the signal demodulated by the MODEM 7 is supplied to the signal processing circuit 5 in which the demodulated signal is decoded for the data expansion from 8 to 10 bits, and the error correction and interpolation are effected in cooperation with the memories 6a and 6b. The signal decoded by the processing circuit 5 is supplied to the D/A converting section 4b of the converting circuit 4 for conversion in the latter to the corresponding analog signal which is, in turn, supplied to the analog noise reduction circuit 3. The resulting analog signal output from the circuit 3 is supplied to a terminal 22a of a mode change-over switch 22 which is made to be in the condition shown in full lines on FIG. 1 by the mode selection signal $S_m$ from the system controller 100 during a reproducing operation in the first mode. In such condition of the mode change-over switch circuit 22, the analog audio output signal from the circuit 3 is passed through the switch circuit 22 to an audio output terminal 23.

On the other hand, if the signal $S_m$ from the system controller 100 establishes the second mode corresponding to the 8–10 conversion system during a reproducing operation of the apparatus, the switch circuits 8 and 22 are changed-over to the conditions shown in broken lines on FIG. 1 so that the signal reproduced by the magnetic head 20 is supplied through the switch circuits 9 and 8 to the MODEM 19. The signal demodulated by the MODEM 19 is supplied to the signal processing circuit 17 wherein the demodulated signal is decoded and subjected to error correction and interpolation in connection with the memories 18a and 18b. The resulting decoded signal is supplied to the D/A converting section 16b of the converting circuit 16 so as to be converted in the latter to an analog audio output signal applied to the terminal 22b of the mode change-over switch circuit 22. Thus, the analog audio output signal is supplied through the switch circuit 22 to the audio output terminal 23.

Further, in the reproducing operation of the apparatus, the servo pilot signal contained in the output of the reproducing amplifier 21 is supplied to a conventional servo circuit 24, and is there used to effect the capstan servo, that is, to control the speed of the capstan drive motor (not shown) for maintaining tracking servo control. Furthermore, the video signal contained in the output from the reproducing amplifier 21 is delivered to a video signal output terminal 25.

In accordance with the present invention, the illustrated apparatus is further shown to be provided with a pilot signal oscillator 26 which supplies a pilot signal $S_p$ to a respective input of the mixing circuit or multiplexer 10. The pilot signal oscillator 26 is shown to be selectively connected through a mode change-over switch circuit 27 with an oscillating element or crystal 28 oscillating at a frequency $f_1$, or with an oscillating element or crystal 29 oscillating at a different frequency $f_2$. More specifically, the oscillating elements 28 and 29 are respectively connected to terminals 27a and 27b of the mode change-over switch circuit 27 so that, when the latter is in the condition shown in full lines in response to the mode selection signal $S_m$ selecting the first mode corresponding to the bi-phase system, the oscillating element 28 is connected to the oscillator 26 for causing the latter to generate the pilot signal $S_p$ with the frequency $f_1$ which is, therefore, characteristic of the first mode. On the other hand, when the switch circuit 27 is changed-over by the mode selection signal $S_m$ to the condition shown in broken lines, as when recording is to be effected in the second mode corresponding to the 8-10 conversion system, the oscillating element 29 is connected to the oscillator 26 so that the latter generates the pilot signal with the frequency $f_2$ which is characteristic of the second mode. In either case, that is, whether the pilot signal $S_p$ is generated with the frequency $f_1$ or the frequency $f_2$, such pilot signal $S_p$ having a frequency characteristic of the mode employed for recording is multiplexed in the mixing circuit 10 with the PCM audio signal from the switch circuit 9 and also with the input video signal from the terminal 11 and the servo pilot signal from the terminal 12. The resulting mixed or multiplexed signal from the circuit 10 which includes the pilot signal $S_p$ with the frequency $f_1$ or $f_2$ identifying the first or second mode, respectively, being used for recording, is then passed through the recording amplifier 13 to the magnetic recording head 14 for recording by the latter on the tape 15.

Further, in accordance with this invention, the output of the reproducing amplifier 21 is shown to be connected to band pass filters 30 and 31 having pass bands centered at the frequencies $f_1$ and $f_2$, respectively. The outputs of the band pass filters 30 and 31 are respectively connected through rectifying elements 32 and 33 to comparators 34 and 35 in which the levels of signals derived from the rectifying elements 32 and 33 are compared with adjustably predetermined reference signal levels established by reference signal sources 34a and 35a, respectively. It will be appreciated that, during a reproducing operation of the apparatus, if the reproduced mixed signal includes a pilot signal with the frequency $f_1$ for indicating that the reproduced signal was recorded by the first mode corresponding to the bi-phase system, the pilot signal having the frequency $f_1$ is separated from the reproduced signal in the band pass filter 30 and causes the respective rectifying element 32 to provide an output at a relatively high level by which the comparator 34 generates an output supplied to a central processing unit (CPU) 36 for detecting or discriminating that the reproduced signal was recorded by the bi-phase system. On the other hand, if the reproduced signal was recorded by the second mode corresponding to the 8-10 conversion system, that fact is indicated by the presence of a pilot signal with the frequency $f_2$ in the reproduced signal output by the reproducing amplifier 21. In that case, the pilot signal with the frequency $f_2$ is separated from the reproduced signal in the band pass filter 31 and the output of the latter causes the respective rectifying element 33 to provide a relatively high level output signal to the comparator 35. The comparator 35 compares such relatively high level output signal from the rectifying element 33 with the reference level from the source 35a to provide a comparison output to the CPU 36 for indicating that the reproduced signal was recorded by the second mode or 8-10 conversion system. The CPU 36 supplied to the system controller 100 a mode discrimination signal which causes the controller 100 to suitably determine the mode selection signal $S_m$ for suitably conditioning the mode change-over switch circuits 2, 8, 22 and 27.

In will be appreciated that the frequencies $f_1$ and $f_2$ selectively given to the pilot signal $S_p$ for identifying the mode or format used in recording should be frequencies that will never disturb the reproduced signals and that can be readily separated from the servo pilot signal applied to the input terminal 12. For example, the frequencies $f_1$ and $f_2$ for identifying the first and second modes or formats may be selected to be 230 kHz and 300 kHz, respectively.

The operation of the above described embodiment of the invention is summarized, as follows:

Initially, the user of the apparatus may actuate suitable controls thereof for causing the system controller 100 to generate the signal $S_{R/P}$ for selecting establishing the recording operation of the apparatus, and further to generate the mode selection signal $S_m$ for selecting the first or second mode, that is, the bi-phase system or the 8-10 conversion system, respectively, to be used during the recording operation.

If the first mode, that is, the bi-phase system is selected, switch circuits 2, 8, 22 and 27 are disposed in the conditions thereof shown in full lines by the selection signal $S_m$, while the signal $S_{R/P}$ similarly disposes the switch circuit 9 in the condition shown in full lines for the recording operation. With the apparatus in its first mode for recording by, for example, the bi-phase system, the input audio signal is supplied from the input terminal 1 through the switch circuit 2 to the analog noise reduction circuit 3 and, from the latter, through the A/D converting section 4a and the signal processing circuit 5 to the MODEM 7. The resulting modulated signal is supplied through the switch circuits 8 and 9 to the respective input of the mixing circuit 10 for mixing or multiplexing with the video signal from the input terminal 11 and the servo pilot signal from the input terminal 12. Simultaneously, during recording in the first mode, the oscillating element 28 is connected through the switch circuit 27 to the oscillator 26 which is thereby made to generate the pilot signal $S_p$ with the frequency $f_1$ which identifies that recording is being effected by the first mode, that is, the bi-phase system. The pilot signal $S_p$ with the frequency $f_1$ is also multiplexed with the other signals in the mixing circuit 10, and the resulting mixed signal is then supplied through the recording amplifier 13 and recording magnetic head 14 for recording by the latter on the magnetic tape 15.

On the other hand, if the signal is to be recorded in the second mode, for example, by the 8-10 conversion system, the mode change-over switch circuits 2, 8 and 27 are changed-over to the conditions thereof indicated in broken lines on FIG. 1 by a suitable change in the mode selection signal $S_m$. In such case, the audio signal applied to the input terminal 1 is supplied through the switch circuit 2 and the A/D converting section 16a to the signal processing circuit 17, and the processed signal from the latter is modulated in the MODEM 19, with the resulting modulated signal being supplied through the switch circuits 8 and 9 to the mixing circuit 10. In this case, the oscillating element 29 is connected through the switch circuit 27 to the oscillator 26 so that the latter generates the pilot signal $S_p$ with the frequency $f_2$ which indicates the use of the second mode or 8-10 conversion system for recording. Such pilot signal $S_p$ with the frequency $f_2$ is similarly supplied to the mixing circuit 10 for multiplexing with the modulated signal from the MODEM 19 and with the video signal and the servo pilot signal from the terminals 11 and 12. Once again, the resulting mixed signal is supplied through the recording amplifier 13 to the magnetic head 14 for recording by the latter on the tape 15.

For a reproducing operation of the apparatus, the user thereof manipulates a suitable control (not shown) by which the signal $S_{R/P}$ is made to change-over the switch circuit 9 to the condition indicated in broken lines on FIG. 1. Thereafter, during the reproducing operation, the mixed signal reproduced by the magnetic head 20 is supplied through the reproducing amplifier 21 to the band pass filters 30 and 31. If such reproduced signal includes the pilot signal with the frequency $f_1$, such pilot signal is detected by the band pass filter 30, the rectifying element 32 and the comparator 34 which applies to the CPU 36 a signal indicating that the signal being reproduced was recorded in the first mode, that is, by the bi-phase system. As a result of such indication to the CPU 36, the latter causes the controller 100 to determine the mode selection signal $S_m$ accordingly, that is, to cause the mode change-over switch circuits 8 and 22 to assume the conditions shown in full lines on FIG. 1. Thus, based upon the determination from the presence of the recorded pilot signal $S_p$ having the frequency $f_1$, the reproduced signal from the amplifier 21 is supplied through the switch circuits 9 and 8 to the MODEM 7 for demodulation in the latter. The resulting demodulated signal is then supplied through the signal processing circuit 5 wherein error correction and interpolation are effected and the demodulated signal is decoded for the data expansion from 8 to 10 bits. The signal decoded by the circuit supplied to the D/A converting section 4b to be converted to the corresponding analog signal which is, in turn, supplied through the analog noise reduction circuit 3 and the switch circuit 22 to the output terminal 23.

On the other hand, if the pilot signal $S_p$ included in the recorded mixed signal has the frequency $f_2$ for indicating that such signal was recorded by the second mode, that is, by the 8-10 conversion system, the pilot signal $S_p$ in the reproduced signal derived from the output of the amplifier 21 is detected by the band pass filter 31, the rectifying element 33 and the comparator 35 to provide a corresponding output from the comparator 35 to the CPU 36. As a result of the foregoing, the controller 100 causes the mode selection signal $S_m$ to change-over the switch circuits 8 and 22 to the conditions indicated in broken lines on FIG. 1 with the result that the reproduced signal is supplied from the amplifier 21 through the switch circuits 9 and 8 to the MODEM 19 for the second mode or 8-10 conversion system. The resulting demodulated signal is supplied from the MODEM 19 to the signal processing circuit 17 wherein the demodulated signal is decoded, and error correction and interpolation are effected in cooperation with the memories 18a and 18b. Finally, the decoded signal is supplied from circuit 17 through the D/A converting section 16b, and the resulting analog signal is supplied through the switch circuit 22 to the audio signal output terminal 23.

It will be appreciated from the above that, since the pilot signal $S_p$ having first and second different frequencies $f_1$ and $f_2$ in accordance with the first and second modes or formats, respectively, used in recording is multiplexed and recorded with the other signals, including the PCM audio signal, recorded on the tape, it is possible, upon the initiation of the reproducing operation, to easily detect the pilot signal and determine its frequency, and thereby determine the mode or format used in the recording of the signals. It will be apparent that an extremely simple construction of the apparatus can perform the foregoing detection function, from which the corresponding mode is established for the reproducing operation. Therefore, the apparatus embodying this invention reliably operates in the correct mode during reproducing, that is, in the same mode as was used for recording the reproduced signals, with the result that correct or relatively error free reproduction of the recorded PCM audio signal is realized.

Although the illustrated embodiment of the invention has been described as being capable of recording the PCM audio signal either by the bi-phase system identified as the first mode, or by the 8-10 conversion system identified as the second mode, it will be appreciated that other modes or systems having different formats can also be used. Thus, for example, a mode may be employed in which rectilinear 16 bits are compressed to polygonal-line 12 bits in the circuit 17 and the modulating and demodulating circuit or MODEM 19 effects the modulation of a 6-7 conversion system.

In any case, in accordance with the present invention, as described above, since, during recording, the pilot signal having a specific frequency characteristic of the mode or format used in recording, is multiplexed and recorded with the other signals, such as, the PCM audio signal, it is possible, upon the initiation of a reproducing operation, to easily detect such pilot signal by its frequency and to determine therefrom the mode or format used in recording by means of an extremely simple construction of the apparatus.

Having described a specific embodiment of the invention with reference to the accompany drawing, it is to be understood that the invention is not limited to that precise embodiment, and that various changes and modification may be effected therein by one skilled in the art without departing from the scope or spirit of the invention as defined in the appended claims.

What is claimed is:

1. An apparatus for magnetically recording and/or reproducing a digital signal in a first mode characterized by a respective transfer rate and format or in a second mode characterized by a respective transfer rate and format, said apparatus comprising:
   means for generating a first pilot signal having a first frequency and a second pilot signal having a second frequency different from said first frequency;
   means operative in said first and second modes during a recording operation of the apparatus for selectively mixing said first and second pilot signals, respectively, with the digital signal to be recorded, and thereby providing a resultant mixed signal;
   means selectively operative for recording and reproducing said mixed signal; and
   means operative during a reproducing operation of the apparatus for selectively detecting, in the reproduced mixed signal, said first and second pilot signals having said first and second frequencies, respectively, and, on the basis of the detected pilot signal, establishing the respective one of said first and second ;modes of the apparatus, including first and second band pass filter means receiving the reproduced mixed signal and adapted to pass said first and second frequencies, respectively, first and second rectifier means receiving outputs of said first and second band pass filter means, respectively, and first and second comparators for comparing outputs of said first and second rectifier means with respective reference levels and thereby selectively indicating the presence of said first or second pilot signal in said reproduced mixed signal.

2. An apparatus according to claim 1; in which said means for selectively mixing includes multiplexing means.

3. An apparatus according to claim 1; in which said first and second modes are a bi-phase system and an 8-10 conversion system, respectively.

4. An apparatus according to claim 1; further comprising first and second signal processing means adapted for processing the digital signal during said recording and reproducing operations and being selectively made operative in said first and second modes, respectively.

* * * * *